United States Patent
Wu

Patent Number: 5,593,489
Date of Patent: Jan. 14, 1997

[54] ACID RESISTANT CARBONATE COMPOSITION CONTAINING AN ALUMINUM OR MAGNESIUM HYDROXIDE METHODS OF PREPARATION AND USES THEREFOR

[75] Inventor: Kuan-Ting Wu, Sandersville, Ga.

[73] Assignee: ECC International Inc., Atlanta, Ga.

[21] Appl. No.: 546,222

[22] Filed: Oct. 20, 1995

[51] Int. Cl.$^6$ ....................................... C09C 1/02
[52] U.S. Cl. .................. 106/464; 106/465; 106/471; 162/181.1; 162/181.4; 162/181.5; 162/183
[58] Field of Search ................... 106/464, 465, 106/471; 162/158, 162, 181.1, 181.4, 181.5, 183; 423/430

[56] References Cited

U.S. PATENT DOCUMENTS

| | | |
|---|---|---|
| 3,197,322 | 7/1965 | Maskel et al. ...................... 106/464 |
| 3,639,158 | 2/1972 | Maskel et al. ...................... 162/162 |
| 3,869,299 | 3/1975 | Periard ............................. 162/181.5 |
| 3,941,610 | 3/1976 | Maskel et al. ...................... 106/464 |
| 4,242,318 | 12/1980 | Brahm et al. ...................... 106/464 |
| 5,043,017 | 8/1991 | Passaretti .......................... 106/464 |
| 5,075,093 | 12/1991 | Tanaka et al. ..................... 106/464 |
| 5,156,719 | 10/1992 | Passaretti .......................... 162/181.1 |
| 5,230,734 | 7/1993 | Kumasaka et al. ................. 106/464 |

*Primary Examiner*—Mark L. Bell
*Assistant Examiner*—Michael Marcheschi
*Attorney, Agent, or Firm*—Klauber & Jackson

[57] ABSTRACT

An improved form of calcium carbonate which is acid resistant to enable its use as a filler material in the making of neutral to weakly acid paper, and a process for producing this acid resistant calcium carbonate are provided. This acid resistant calcium carbonate comprises a mixture of at least about 0.1 percent, based on the dry weight of the calcium carbonate, of an aluminum or magnesium hydroxide, together with at least about 0.1 percent, based on the dry weight of the calcium carbonate, of a mixture of weak acids.

18 Claims, 6 Drawing Sheets

1

ACID RESISTANT CARBONATE COMPOSITION CONTAINING AN ALUMINUM OR MAGNESIUM HYDROXIDE METHODS OF PREPARATION AND USES THEREFOR

BACKGROUND OF THE INVENTION

This invention relates generally to calcium carbonate for use in papermaking, and related industries, and more particularly to a calcium carbonate having acid resistant properties.

Titanium dioxide and calcined clay have traditionally been utilized as filler materials in the preparation of neutral to weakly acidic paper in order to improve the optical properties, especially the brightness, of the resultant product. These materials, however, especially titanium dioxide, have the disadvantage of being very expensive, resulting in higher manufacturing costs and an uncompetitively priced paper product.

Calcium carbonate, particularly precipitated calcium carbonate, has been used as a filler material in the making of alkaline paper. Such usage results in a paper with enhanced optical properties, without the expense incurred in using titanium oxide fillers, resulting in a much less expensive product. Calcium carbonate, however, cannot generally be used as a filler in acidic paper because it decomposes in an acidic environment. Consequently, there has long been a need to develop a calcium carbonate composition which is acid stabilized and resistant to decomposition at low pH, so that it can be utilized as a filler material in the manufacture of acidic paper, such as groundwood paper, where the use of an alkaline filler would have a negative impact on the final paper properties.

Paper made from mechanical pulps has been traditionally produced under acidic papermaking conditions because of "fiber alkaline darkening" that occurs as pH rises. This means that there is a reduction in brightness of the paper (brightness reversion) when the pH is raised from acid to alkaline in wood-containing systems. Alkaline darkening will occur to some degree in any wood pulps with significant lignin content. The degree of darkening depends on the particular pulps, pH, and water quality. In general, ground calcium carbonate and precipitated calcium carbonate fillers buffer wet end in the 7.5–8.2 pH range. Acid-resistant calcium carbonate compositions thus provide a means for reducing the degree of fiber alkaline darkening and brightness reversion due to their ability to maintain a stabilized pH.

U.S. Pat. No. 5,043,017, (June Passaretti, assigned to Pfizer, Inc.) discloses and claims an acid-stable calcium carbonate resistant to degradation in a mildly acidic environment which comprises a mixture of a calcium-chelating agent or a conjugate base, and a weak acid, such that calcium carbonate is coated by, and is in equilibrium with, the calcium-chelating agent or conjugate base and the weak acid. Preferred calcium carbonate compositions shown in this disclosure are compositions containing sodium hexametaphosphate and phosphoric acid.

OBJECTS OF THE INVENTION

It is an object of the present invention to provide stabilized and acid resistant calcium carbonate compositions especially suitable for use in papermaking applications. These stabilized and acid resistant calcium carbonate compositions contain, in addition to the calcium carbonate, an aluminum or magnesium hydroxide, together with a mixture of two or more weak acids.

It is a further object of the present invention to provide a process for the preparation of the aforesaid calcium carbonate compositions.

A still further object of the present invention is to provide a paper having enhanced optical qualities prepared using the calcium carbonate compositions of the present invention.

SUMMARY OF THE INVENTION

The present invention relates to an improved form of calcium carbonate which is stabilized and thus, acid resistant, to enable its use as a filler material in the making of neutral to weakly acid paper, and a process for producing this acid resistant calcium carbonate. More particularly, this invention concerns an acid resistant calcium carbonate comprising a mixture of at least about 0.1 percent, based on the dry weight of the calcium carbonate, of an aluminum or magnesium hydroxide together with at least about 0.1 percent, based on the dry weight of the calcium carbonate, of a mixture of two or more weak acids. It has surprisingly been found that the inclusion of the aluminum or magnesium hydroxide and the mixture of two or more weak acids confers a higher degree of stability and acid resistance for calcium carbonate in the presence of fiber slurry, and a longer term of pH stability than the prior art acid-stabilized calcium carbonate compositions.

DETAILED DESCRIPTION OF THE INVENTION

Figure 1:
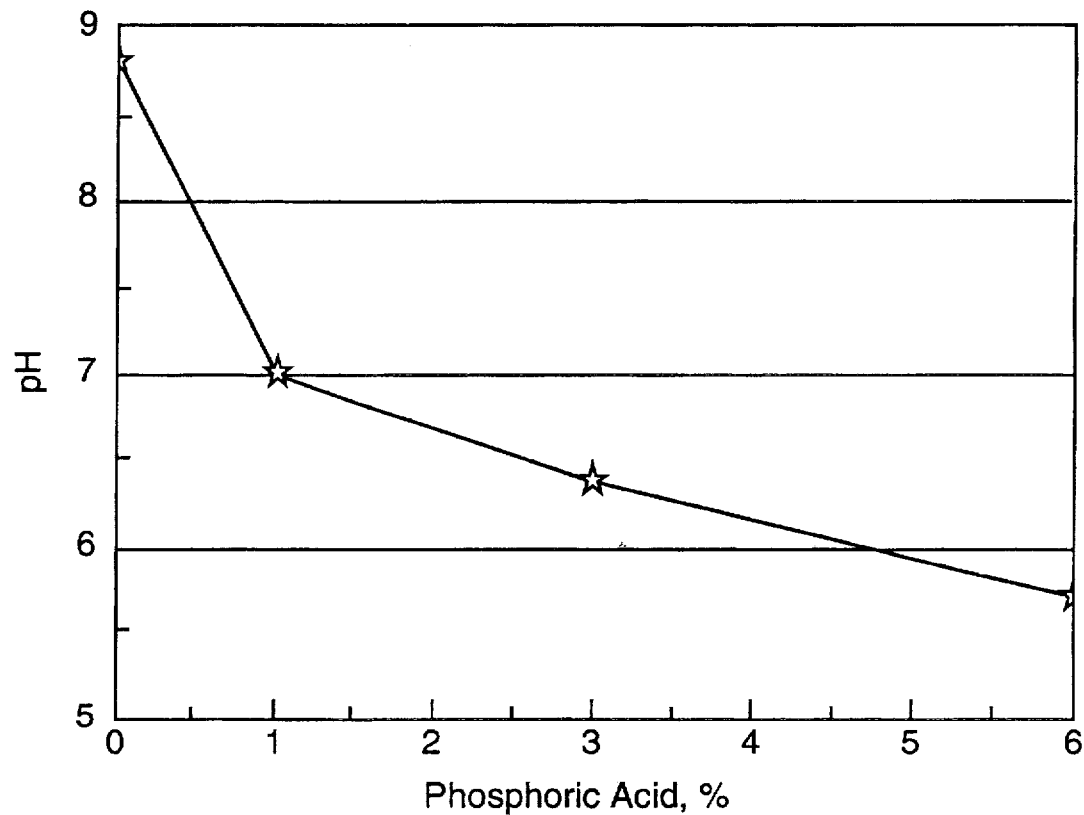
FIG. 1 is a graph comparing the 24 hours ageing of scalenohedral precipitated calcium carbonate compositions of the present invention containing 1% aluminum hydroxide, 1% polyacrylic acid and various concentrations of phosphoric acid.

The improved form of calcium carbonate prepared by the instant invention is stabilized, and thus, acid resistant, to enable its use as a filler material in the making of neutral to weakly acid paper. While not wishing to be bound by any particular theory as to the operability of the present invention, it is believed that the acid resistance conferred upon the calcium carbonate compositions of the present invention is a result of the inactivation of the surface of the calcium carbonate by the addition of the magnesium or aluminum hydroxide and the mixtures of the two weak acids.

In the practice of the present invention, the calcium carbonate compositions are rendered acid resistant by the inclusion of at least about 0.1 percent, based on the dry weight of the calcium carbonate, of an aluminum or magnesium hydroxide, together with at least about 0.1 percent, based on the dry weight of the calcium carbonate, of a mixture of two or more weak acids. Especially preferred as one component of the mixture of weak acids is an organic, polymeric weak acid, such as polyacrylic or polymaleic acid.

While not wishing to be bound by any theory, it is believed that the capability of the acid-stabilized calcium carbonate of the present invention to resist dissociation in an acidic environment is due to the polymer adsorption on the surface of the calcium carbonate, absorption of polymer functional groups on the calcium carbonate surface, and the formation of a buffering system between anionic functional groups of the polymer and a weak acid, or the polymeric acid and the aluminum or magnesium hydroxide. This mechanism of polymer adsorption is distinct from absorption or reaction of the prior art sodium hexametaphosphate on the surface of calcium carbonate. Polymer adsorption can provide a barrier coating on the surface of calcium carbonate which reduces the dissolution reaction of calcium carbonate. On the other hand, the absorption or reaction of sodium hexametaphosphate is limited to the surface of the calcium carbonate.

The hydroxides of aluminum or magnesium utilized in the compositions of the present invention include the various salt forms, either hydrated or unhydrated, such as aluminum hydroxide, magnesium hydroxide, and magnesium carbonate hydroxide. The amount of the aluminum or magnesium hydroxide utilized is at least 0.1 percent, based on the dry weight of the calcium carbonate, and is preferably about 1 to about 6 percent, based on the dry weight of calcium carbonate.

The weak acids utilized in the compositions of the present invention are preferably weak acids selected from the group consisting of phosphoric acid, metaphosphoric acid, hexametaphosphoric acid, ethylenediaminetetraacetic acid (EDTA), citric acid, sulfurous acid, boric acid, acetic acid and weak acids derived from organic polymeric acids, such as polyacrylic acid, polymaleic acid and polycarboxylic acid. As noted hereinbefore, the mixture of weak acids preferably contains at least one weak acid which is derived from an organic, polymeric acid. These organic polymeric acids are typically an organic polymer having a weight average molecular weight, $M_w$, in the range of 750–1,000,000, consisting of regularly repeating units or chemically similar units, connected by primary covalent bonds. The total amount of the weak acids utilized is at least 0.1 percent, based on the dry weight of the calcium carbonate, and is preferably about 1 to about 8 percent, based on the dry weight of the calcium carbonate.

Preferred combinations of the hydroxides of aluminum or magnesium with weak acids for use in the present invention include aluminum hydroxide/polyacrylic acid/phosphoric acid, magnesium carbonate hydroxide/polyacrylic acid/phosphoric acid, aluminum hydroxide/polymaleic acid/phosphoric acid, magnesium hydroxide/polymaleic acid/phosphoric acid, and magnesium carbonate hydroxide/polymaleic acid/phosphoric acid.

The calcium carbonate utilized is preferably finely divided and it can be either a precipitated calcium carbonate or a natural ground limestone.

The process for producing this acid resistant calcium carbonate involves first forming a mixture of calcium carbonate with at least about 0.1 percent, based on the dry weight of the calcium carbonate, of the aluminum or magnesium hydroxide to be utilized. Then, at least about 0.1 percent, based on the dry weight of the calcium carbonate, of the mixture of weak acids is added to this resultant mixture. Finally, the resultant mixture is blended for a sufficiently long period of time to ensure uniform mixing of the ingredients.

The calcium carbonate can be utilized in the above-described process either as a dry powder or an aqueous slurry with up to about 60 percent by weight solids content.

The aluminum or magnesium hydroxide can be utilized in the instant process either as a dry solid or as an aqueous suspension. When the calcium carbonate is used in dry powder form, it is preferable to utilize an aqueous suspension of the aluminum hydroxide in order to facilitate homogeneous mixing. Where a slurry of the calcium carbonate is utilized, the solid form of the magnesium or aluminum hydroxide will disperse itself therein so that an aqueous suspension is unnecessary.

The weak acids can be utilized in the process of preparation in either pure concentrated forms or as aqueous solutions. In a preferred embodiment of the instant process, the aluminum hydroxide or magnesium hydroxide is first added to the calcium carbonate, and then, one of the polymeric acids or phosphoric acid, and finally, the second acid. Alternately, the aluminum or magnesium hydroxide, polymeric acid, and phosphoric acid can be added at the same time, or the aluminum or magnesium hydroxide, polymeric acid, and phosphoric acid can be mixed and then added to the calcium carbonate.

The composition of the present invention can be utilized to improve the optical properties of neutral to weakly acidic paper by its addition to the paper during standard manufacturing processes. Typically, the calcium carbonate composition of the present invention is added to a first paper furnish containing components necessary for making acidic paper to thereby form a second paper furnish. The invention will be further illustrated by the following Examples, which are to be considered illustrative of the invention, and not limited to the precise embodiments shown.

EXAMPLE 1

Scalenohedral Precipitated Calcium Carbonate

Figure 2:
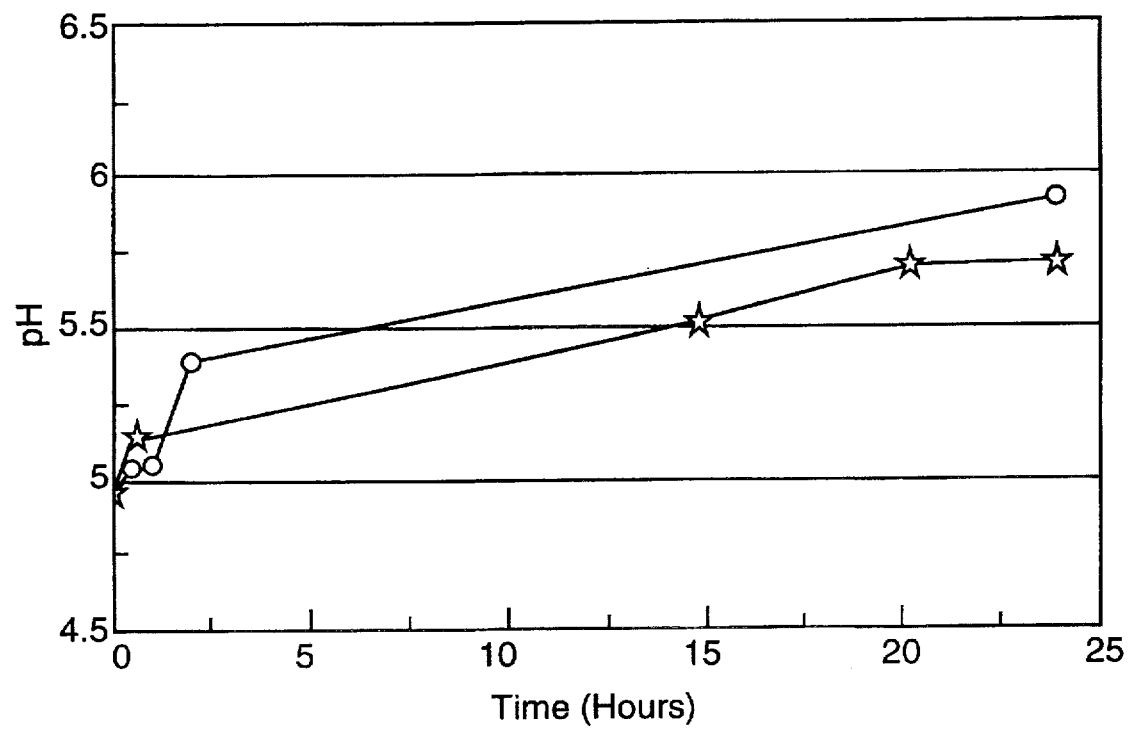
FIG. 2 is a graph comparing the pH of a scalenohedral precipitated calcium carbonate composition of the present invention containing 1% aluminum hydroxide, 1% polyacrylic acid, and 6% phosphoric acid to the pH of a composition of the prior art which contains 1% sodium hexametaphosphate and 7% phosphoric acid.

Acid stabilized scalenohedral precipitated calcium carbonate slurry can be obtained by the addition of an aluminum hydroxide, followed by the addition of a mixture of weak acids such as phosphoric acid and a polymeric acid such as a polyacrylic acid. Initially, 1% aluminum hydroxide, based on the dry weight of calcium carbonate, was added into 19.7% solids slurry of scalenohedral precipitated calcium carbonate. The pH of untreated scalenohedral precipitated calcium carbonate slurry was 8.83. After mixing, 1–6% phosphoric acid and 1% polyacrylic acid, based on the dry weight of calcium carbonate, were added. A plot of the pH was measured for each sample after 24 hours ageing is as shown in FIG. 1. A calcium carbonate composition, containing 1% aluminum hydroxide, based on the dry weight of calcium carbonate, and 6% phosphoric acid and 1% of polyacrylic acid, based on dry weight of calcium carbonate was found to have an initial pH 4.97. After 24 hours ageing the pH was remeasured and found to be 5.73. A comparison composition containing 1% sodium hexametaphosphate, based on the dry weight of calcium carbonate and 7% phosphoric acid, based on the dry weight of calcium carbonate, was similarly prepared and found to have an initial pH of 4.96, and a pH of 5.94 after 24 hours ageing as shown graphically in FIG. 2. The pH of the composition of the present invention thus has 0.21 unit less than that of the prior an composition containing sodium hexametaphosphate and phosphoric acid. Thus the composition of the present invention has higher acid stability.

EXAMPLE 2

Ground Calcium Carbonate

Figure 3:
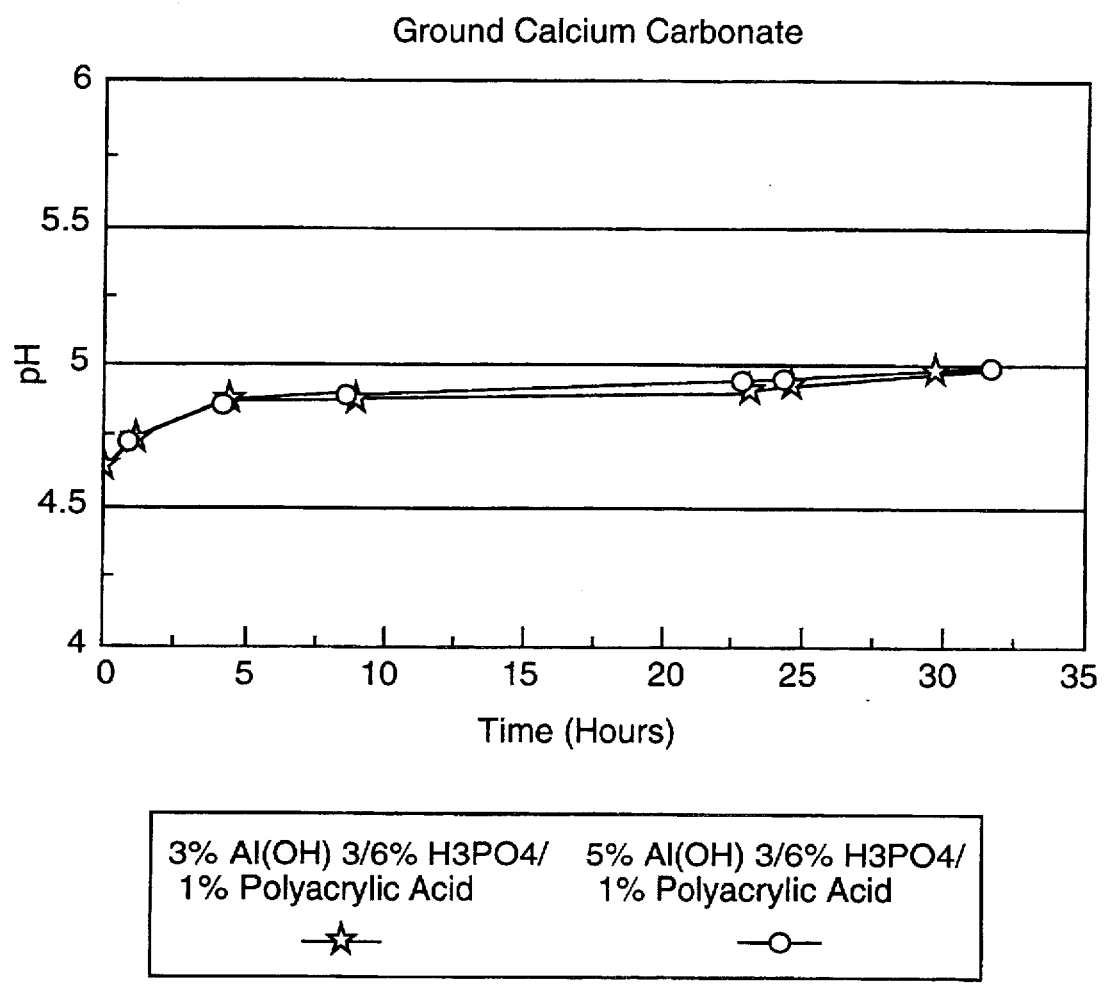
FIG. 3 is a graph showing the pH of ground calcium carbonate compositions of the present invention which contain 3% aluminum hydroxide/1% polyacrylic acid/6% phosphoric acid, or 5% aluminum hydroxide/1% polyacrylic acid/6% phosphoric acid.

The initial pH of ground calcium carbonate was 8.01. Initially, 3% or 5% aluminum hydroxide, based on the dry weight of calcium carbonate, was added into a 20% solids slurry of ground calcium carbonate. After blending, 6% phosphoric acid and 1% polyacrylic acid, based on the dry weight of calcium carbonate, were added. The initial pH of the slurry with 3% aluminum hydroxide/6%$H_3PO_4$/1% polyacrylic acid treatment was measured and found to be 4.63, which rose to a pH of 4.98 after 30 hours ageing as shown graphically in FIG. 3.

EXAMPLE 3

Rhombic Precipitated Calcium Carbonate

Figure 4:
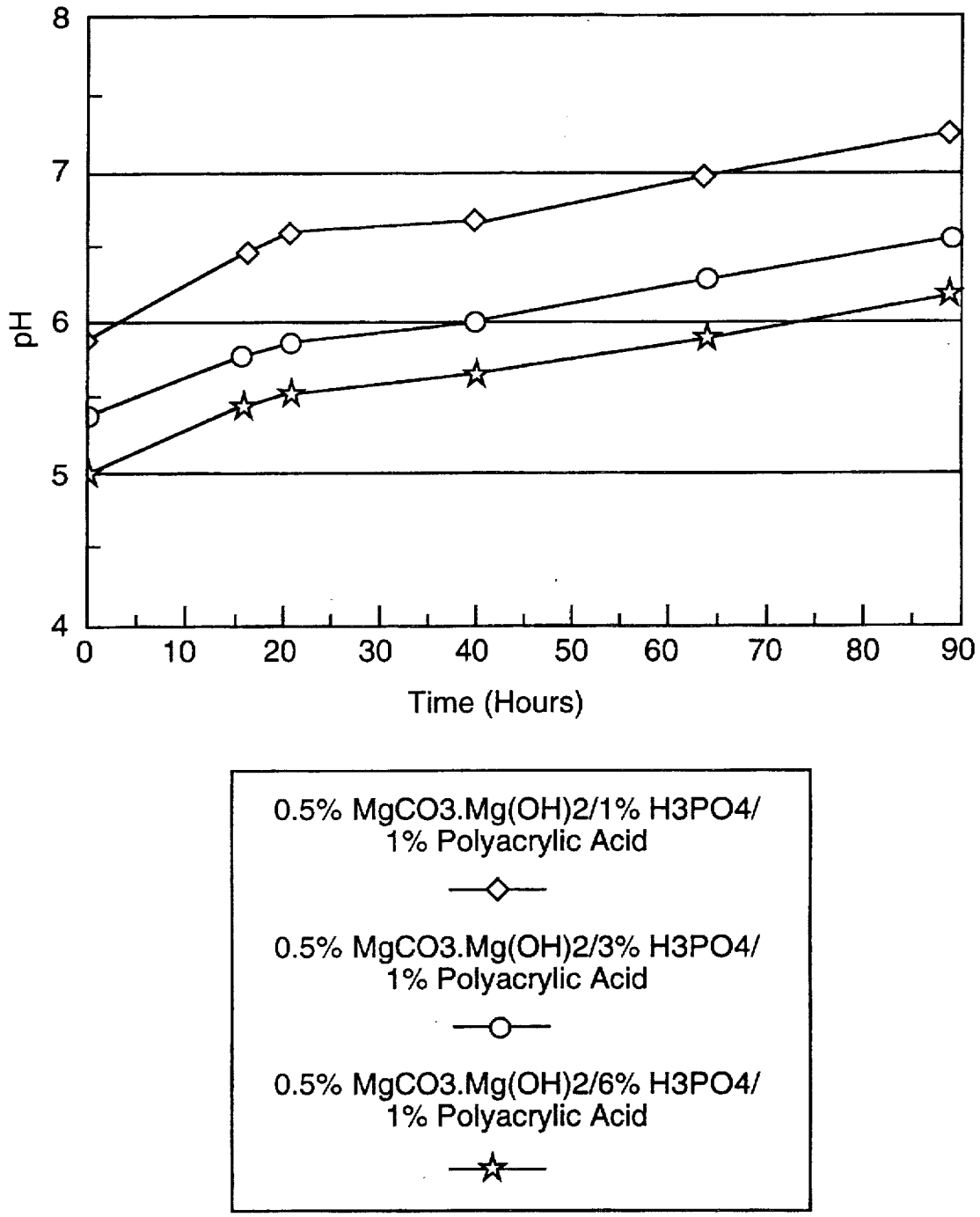
FIG. 4 is a graph showing the pH of rhombic precipitated calcium carbonate compositions of the present invention containing 0.5% magnesium carbonate hydroxide/1% polyacrylic acid/1% phosphoric acid, 0.5% magnesium carbonate hydroxide/1% polyacrylic acid/3% phosphoric acid, or 0.5% magnesium carbonate hydroxide/1% polyacrylic acid/6% phosphoric acid.

Acid stabilized rhombic precipitated calcium carbonate slurry can be obtained by the addition of magnesium carbonate hydroxide [$MgCO_3.Mg(OH)_2$], followed by the addition of a weak acid such as phosphoric acid and a polymeric acid such as polyacrylic acid. Initially, 0.5% magnesium carbonate hydroxide, based on the dry weight of calcium carbonate, was added into 18.2% solids slurry of rhombic precipitated calcium carbonate. The pH of untreated rhombic precipitated calcium carbonate slurry was 8.79. After mixing, 1–6% phosphoric acid and 1% polyacrylic acid, based on the dry weight of calcium carbonate, were added. A plot of the pH was measured for each sample within 90 hours ageing as shown in FIG. 4. A composition containing 0.5% magnesium carbonate hydroxide, based on the dry weight of calcium carbonate, and 6% phosphoric acid and 1% of polyacrylic acid, based on the dry weight of calcium carbonate was found to have an initial pH of the slurry of 5.00, which resulted in a pH=6.18, after 90 hours ageing.

EXAMPLE 4

Ground Calcium Carbonate

Figure 5:
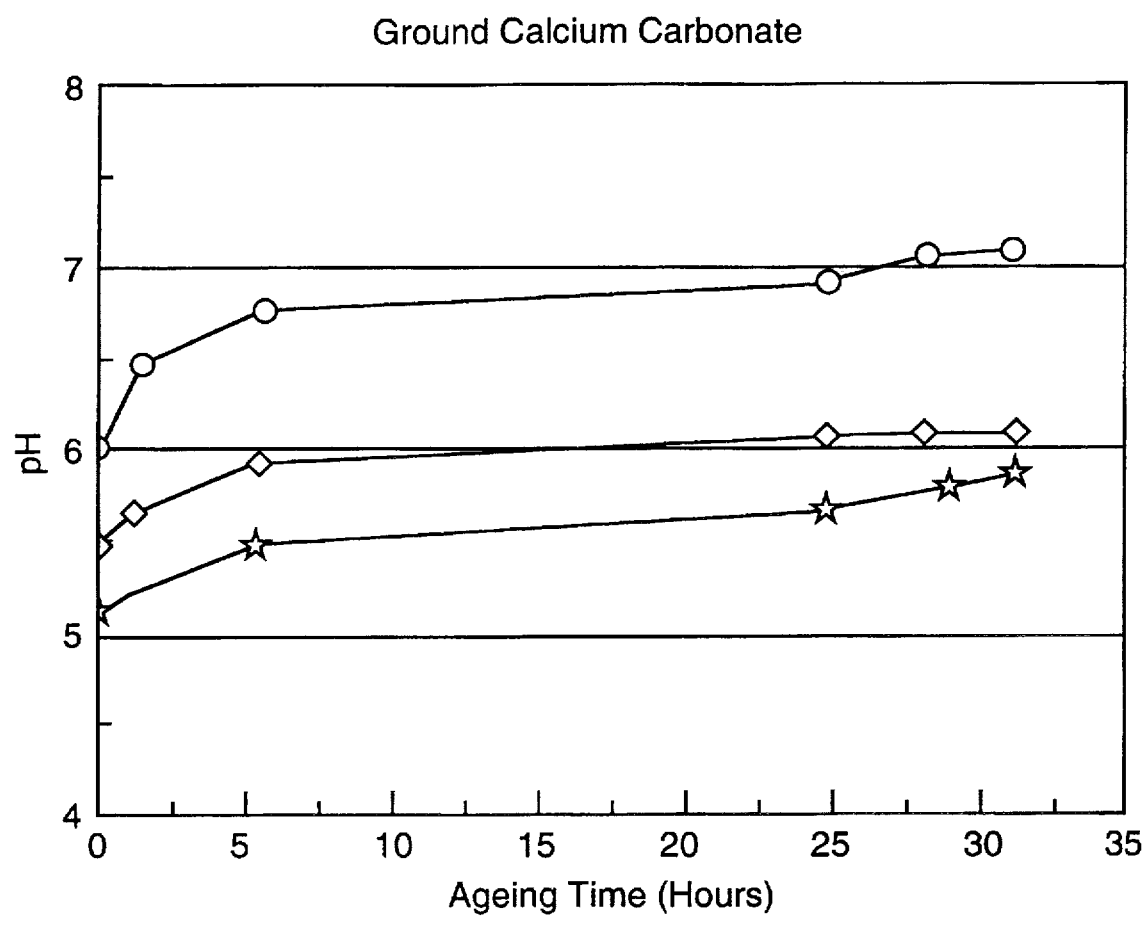
FIG. 5 is a graph comparing the pH of ground calcium carbonate compositions containing 1% magnesium hydroxide/1% polyacrylic acid/2% phosphoric acid, 1% magnesium hydroxide/1% polyacrylic acid/4% phosphoric acid, or 1% magnesium hydroxide/1% polyacrylic acid/6% phosphoric acid.

Acid stabilized ground precipitated calcium carbonate slurry can be obtained by the addition of magnesium hydroxide, followed by the addition of a weak acid such as phosphoric acid and a polymeric acid such as polyacrylic acid. Initially, 1% magnesium hydroxide, based on the dry weight of calcium carbonate, was added into a 20% solids slurry of ground calcium carbonate. The initial pH of calcium carbonate slurry was 8.01. After mixing, 2–6% phosphoric acid and 1% polyacrylic acid, based on the dry weight of calcium carbonate, was added. A plot of pH was measured for each sample after 31 hours ageing as shown graphically in FIG. 5. A composition containing 1% magnesium hydroxide, based on the dry weight of calcium carbonate, and 4% phosphoric acid and 1% of polyacrylic acid, based on the dry weight of calcium carbonate was found to have an initial pH of 5.48, and, after 31 hours ageing, a pH of 6.07.

EXAMPLE 5

Ground Calcium Carbonate

Figure 6:
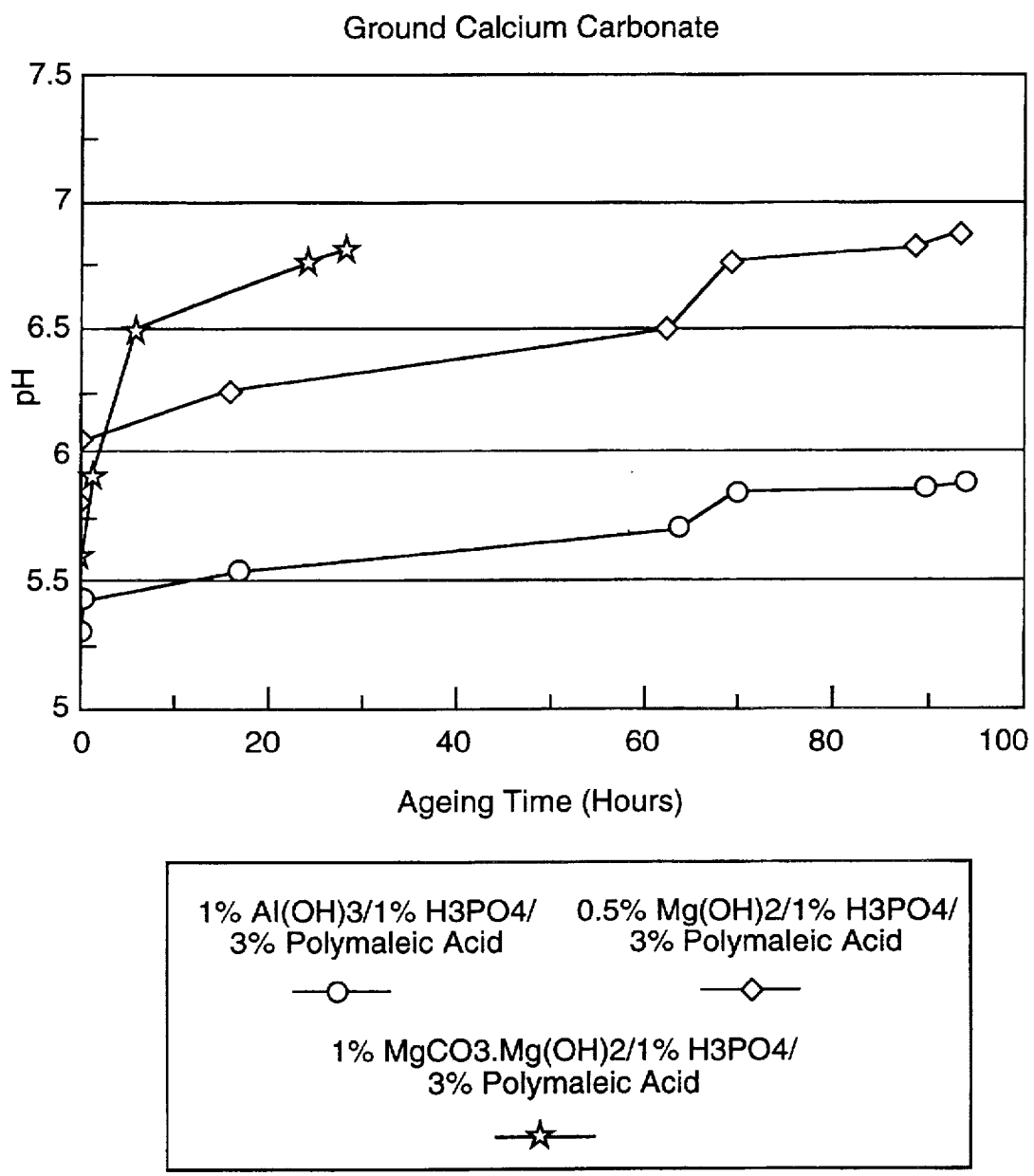
FIG. 6 is a graph comparing the pH of ground calcium carbonate compositions containing 1% aluminum hydroxide/3% polymaleic acid/1% phosphoric acid, 0.5% magnesium hydroxide/3% polymaleic acid/1% phosphoric acid, or 1% magnesium carbonate hydroxide/3% polymaleic acid/1% phosphoric acid.

Acid stabilized ground calcium carbonate slurry can be obtained by the addition of aluminum hydroxide, magnesium hydroxide or magnesium carbonate hydroxide [$MgCO_3Mg(OH)_2$], followed by the addition of a weak acid such as phosphoric acid and a polymeric acid such as polymaleic acid. Initially, 1% aluminum hydroxide, 0.5% magnesium hydroxide or 1% magnesium carbonate hydroxide, based on the dry weight of calcium carbonate, was added into a 20% solids slurry of ground calcium carbonate. The initial pH of calcium carbonate slurry was 8.01. After mixing, 1% phosphoric acid and 3% polymaleic acid, based on the dry weight of calcium carbonate, were added. A plot of the pH was measured for each sample from 28 to 93 hours ageing as shown in FIG. 6. These treated calcium carbonate slurries all performed well in acid stability studies.

What is claimed is:

1. An acid resistant calcium carbonate comprising calcium carbonate in admixture with at least about 0.1 percent, based on the dry weight of the calcium carbonate, of an aluminum or magnesium hydroxide and at least about 0.1 percent, based on the dry weight of the calcium carbonate, of a mixture of two or more weak acids.

2. The acid resistant calcium carbonate of claim 1 wherein said hydroxide is aluminum hydroxide.

3. The acid resistant calcium carbonate of claim 1 wherein said hydroxide is magnesium hydroxide.

4. The acid resistant calcium carbonate of claim 1 wherein said hydroxide is magnesium carbonate hydroxide.

5. The acid resistant calcium carbonate of claim 1 wherein the aluminum or magnesium hydroxide is present in an amount of about 1 to about 6 percent, based on the dry weight of the calcium carbonate.

6. The acid resistant calcium carbonate of claim 1 wherein the weak acids are selected from the group consisting of polyacrylic acid, polymaleic acid and phosphoric acid.

7. The acid resistant calcium carbonate of claim 6 wherein the mixture of weak acids includes at least one weak acid which is an organic, polymeric acid.

8. The acid resistant calcium carbonate of claim 6 wherein the mixture of weak acids is comprised of polyacrylic acid and phosphoric acid.

9. The acid resistant calcium carbonate of claim 6 wherein the mixture of weak acids is comprised of polymaleic acid and phosphoric acid.

10. The acid resistant calcium carbonate of claim 1 wherein the mixture of weak acids is present in an amount of about 1 to about 8 percent, based on the dry weight of the calcium carbonate.

11. A process for the preparation of an acid resistant calcium carbonate composition which comprises:
   a) forming a mixture of calcium carbonate with at least about 0.1 percent, based on the dry weight of the calcium carbonate, of an aluminum or magnesium hydroxide;
   b) adding at least about 0.1 percent, based on the dry weight of the calcium carbonate, of a mixture of two or more weak acids to the mixture; and
   c) blending the resultant mixture to ensure uniform mixing.

12. The process according to claim 11 wherein the weak acids of the mixture are selected from the group consisting of polyacrylic acid, polymaleic acid and phosphoric acid.

13. The process according to claim 12 wherein the mixture of weak acids includes at least one weak acid which is an organic, polymeric acid.

14. The process according to claim 11 wherein the mixture of weak acids is comprised of polyacrylic acid and phosphoric acid.

15. The process according to claim 11 wherein the mixture of weak acids is comprised of polymaleic acid and phosphoric acid.

16. The process according to claim 11 wherein the aluminum or magnesium hydroxide is present in an amount of about 1 to about 6 percent, based on the dry weight of the calcium carbonate.

17. The process according to claim 11 wherein the mixture of weak acids is present in an amount of about 1 to about 8 percent, based on the dry weight of the calcium carbonate.

18. A method of improving optical properties of neutral to weakly acidic paper by the addition of a calcium carbonate composition which comprises calcium carbonate in admixture with at least about 0.1 percent, based on the dry weight of the calcium carbonate, of an aluminum or magnesium hydroxide and at least about 0.1 percent, based on the dry weight of the calcium carbonate, of a mixture of two or more weak acids.

\* \* \* \* \*